April 20, 1937.   R. S. SANFORD ET AL   2,078,209
BRAKE
Filed May 6, 1932   4 Sheets-Sheet 1

INVENTORS
EUGENE G. CARROLL
ROY S. SANFORD
BY Jerome R. Cox
ATTORNEY.

April 20, 1937. R. S. SANFORD ET AL 2,078,209
BRAKE
Filed May 6, 1932 4 Sheets-Sheet 2

INVENTORS
EUGENE G. CARROLL
ROY S. SANFORD
BY
Jerome R. Cox
ATTORNEY.

April 20, 1937.  R. S. SANFORD ET AL  2,078,209

BRAKE

Filed May 6, 1932  4 Sheets-Sheet 3

INVENTORS.
EUGENE G. CARROLL
ROY S. SANFORD
BY Jerome R. Cox
ATTORNEY.

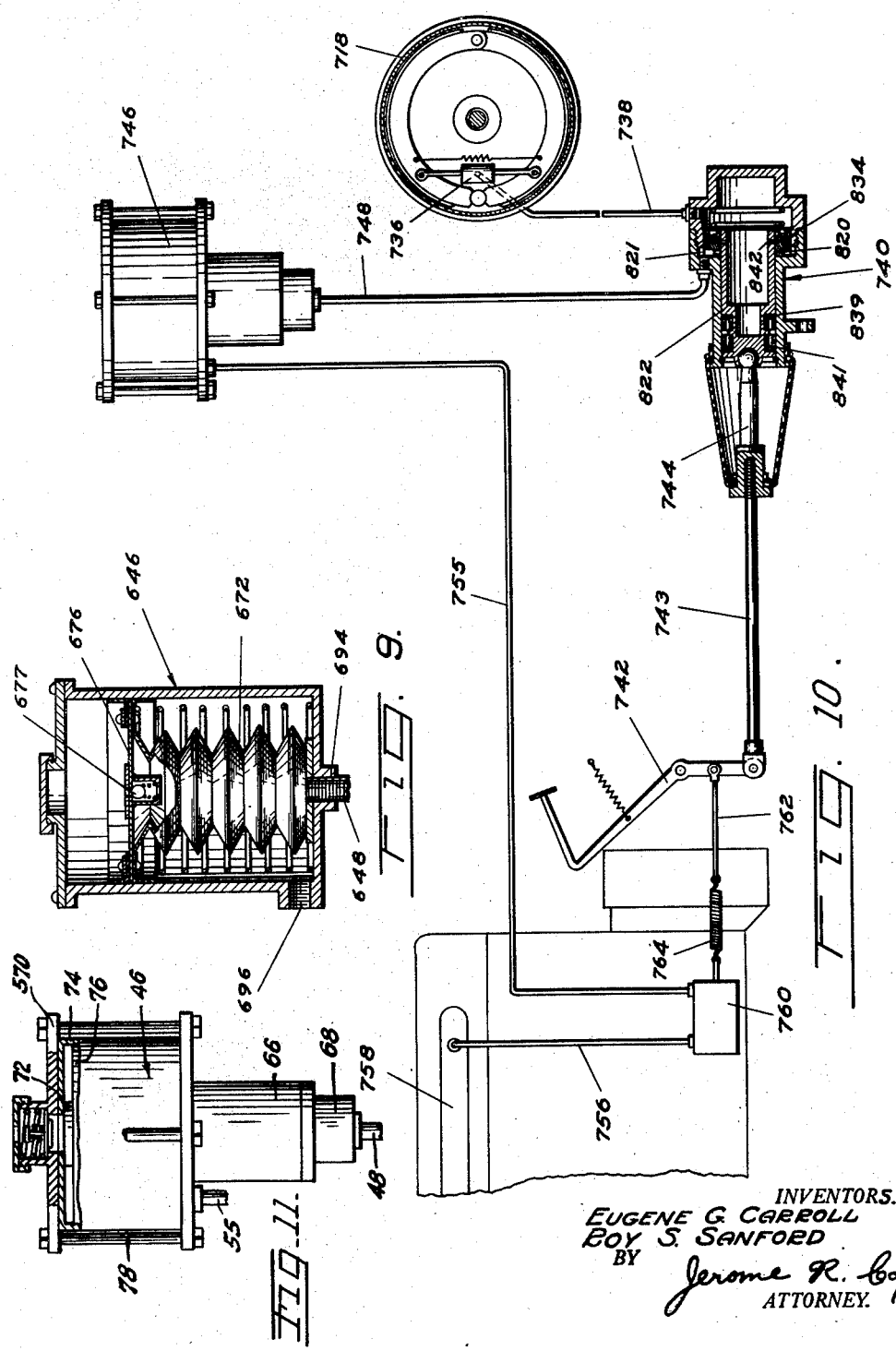

Patented Apr. 20, 1937

2,078,209

UNITED STATES PATENT OFFICE 2,078,209

BRAKE

Roy S. Sanford and Eugene G. Carroll, South Bend, Ind., assignors to Bendix Aviation Corporation, South Bend, Ind., a corporation of Delaware Application May 6, 1932, Serial No. 609,716

21 Claims. (Cl. 188—152)

This invention relates to brakes for automotive vehicles and is described particularly as applied to a hydraulic braking system.

Service brakes of automotive vehicles are usually applied through a foot pedal which normally through mechanical or hydraulic linkage takes up the slack in the system, applies the brake shoes to the brake drums, and exerts pressure to force the shoes more tightly against the drums. As the shoes wear, the slack in the system becomes greater and therefore greater pedal travel is required to move the shoes into contact with the drum. Inasmuch as the amount of pedal travel is limited by the space available in the car and by the distance which the operator's leg may move comfortably, and inasmuch as it is necessary to allow for slack take-up, for sufficient clearance to prevent the brakes from dragging, for distortion of the parts due to pressure, for drum expansion from heat, and for lining wear; therefore the leverage ratio between the pedal movement and the movement of the shoes is limited and the available mechanical advantage is also limited.

We have discovered that if the shoes be automatically moved into contact with the drum whenever it is desired to apply the brakes and then the pedal used only to apply greater pressure, and to take care of drum expansion due to heat, little reserve of pedal travel need be retained and also the movement of the pedal relative to the small movement of the shoes can be relatively large. Therefore, it is possible to use a large leverage ratio and obtain high braking pressures with low pedal pressures and at the same time, due to the fact that the power device does not do the actual braking, it is possible to retain a definite proportionate ratio between the pedal and brake so that the brake is perfectly controllable. Moreover, the effort required to move the shoes into contact with the drum is relatively small and therefore does not require the expenditure of much power.

One of the objects of our invention is the elimination of the necessity of adjustments to brakes for wear, the pedal travel for braking remaining the same throughout the life of the vehicle regardless of wear.

A further object is to provide means for applying the brakes to the drums automatically thus eliminating part of the pedal travel usually required whereby it is possible to utilize practically the full pedal travel for creating high braking pressures.

A further object is the provision of means responsive to the initial movement of the pedal for energizing a power device.

One of the novel features of our invention is a master cylinder provided with fluid pressure actuating means comprising a chamber adapted to receive fluid pressure.

A further feature is the provision of a pressure relief chamber in combination with a master cylinder.

Another feature is a reservoir for a reserve supply of liquid provided with concentric pistons, at least one of which is acted on by vacuum or other fluid power and another of which acts on the operating liquid to force it to the master cylinder, so that the reservoir serves both for containing a reserve supply of liquid and also as a slack take up power device.

Further features are the combination of power actuation of the low pressure phase of a two phase hydraulic system and manual operation of the high pressure phase at high ratios; an annular plunger for the master cylinder surrounding a central high pressure plunger and normally operated separately by power in combination with means on the central plunger for operating the annular piston in an emergency; the arrangement of check valves in the reservoir; control of the power operation electrically; and a pressure relief cylinder having connections leading from both ends thereof and provided with a spring urged piston therein.

Further objects and features of the invention will be apparent after a reading of the subjoined specification and claims and after consideration of the accompanying drawings in which:

Figure 9 is a view in vertical section showing a modified form of reservoir;

Figure 10 is a diagrammatic view with parts in vertical section of another braking system; and Figure 11 is a view partly in elevation and partly in section showing a combined reservoir and power actuator equipped with a cover plate such as that shown in Figure 8.

Figure 1:
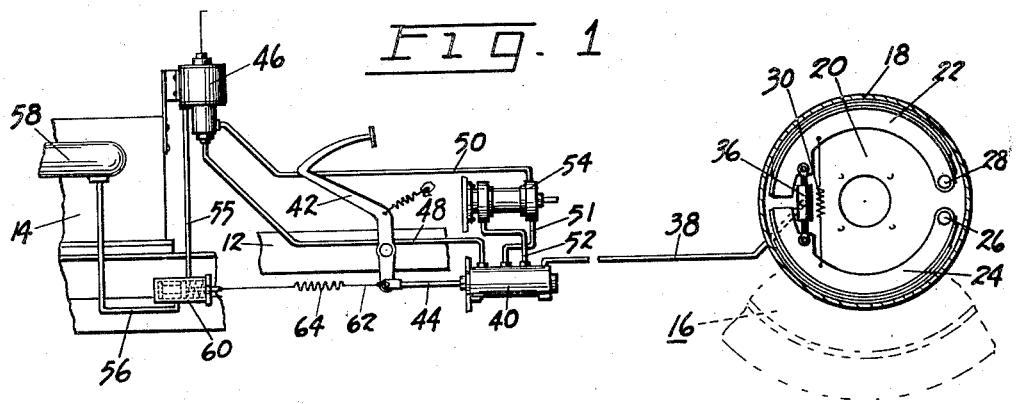
Figure 1 is a diagrammatic view in elevation of a braking system constructed according to our invention.

Referring in detail to the drawings and especially to Figures 1 to 4, inclusive, thereof, we have shown diagrammatically an automobile having a frame 12, and an engine 14 and supported by road wheels such as 16. Each road wheel is provided with means for braking the vehicle including a drum such as 18, a backing plate such as 20 and brake shoes such as 22 and 24 pivotally anchored as at 26 and 28. The shoes are adapted to be held normally in a released position by a return spring 30.

Means are provided for applying the brake shoes to their associated drums. Positioned between the shoes 22 and 24 is an operating or wheel cylinder 36 to which liquid or other suitable fluid is supplied through a conduit 38 from a master cylinder 40. Ordinarily the high pressure piston of the master cylinder 40 is operated by a foot pedal 42 through a piston rod 44 and the low pressure piston thereof through a power take-up device later to be described.

Fluid is supplied to the master cylinder 40 from a combined reservoir and power slack take-up device 46 through conduits 48, 50, 51, and 52 and through pressure relief cylinder 54 in a manner which will later be more fully described. In the process of creating power, air is withdrawn from the reservoir 46 by pipe connections 55 and 56, the latter having one end leading to the intake manifold 58 of the engine 14 and having a vacuum control valve 60 interposed between the connections 55 and 56.

The valve 60 is controlled by a tension element 62 so that the valve is normally open to the atmosphere but initial movement of the pedal 42 moves the valve 60 to connect the pipe connections 55 and 56 and to withdraw air from the reservoir and power slack take-up device, 46. Interposed in the tension element 62 is a spring 64 which allows overtravel of the pedal after the valve has connected the pipe connections 55 and 56.

The combined reservoir and power slack take-up device 46 comprises chiefly a main casting 66, a lower cap 68, an upper cap 70, a hydraulic plunger 72, a light cylinder or can 74 interposed between the casting 66 and the upper cap 70 and a vacuum piston 76 secured to the plunger 72 in the can 74. Bolts 78 are provided for clamping the can 74 between the outer parts of the device. Annular sealing cups 80, 82, and 84 are secured in the casting 66 around the plunger 72. Between the cups 80 and 82 the casting 66 is provided with vent openings 86 to prevent the vacuum formed at times in the can 74 from drawing liquid from the lower part of the casting 66. An annular plate 85 formed with grooves 87 is secured between the casting 66 and the cap 68 and aids in maintaining the cup 84 in position. The lower end of the plunger 72 is formed with grooves 89 which cooperate with the grooves 87 to allow liquid to flow between the cap 68 and the lower part of the casting 66 when the plunger is in its retracted position.

The plunger 72 is adapted to hold a large portion of the reserve supply of liquid, maintaining it under atmospheric pressure. A float 88 is provided to indicate the height of the liquid therein. The plunger 72 adjacent to its lower end is provided with ports 90 through which liquid may pass freely into the lower part of the casting 66, the casting being provided with a tapped opening 92 to which the conduit 50 is connected. The lower cap 68 is also adapted to hold liquid which is at times placed under pressure by the plunger 72, and is provided with a tapped opening 94 connected with the conduit 48.

The first slight movement of the pedal acts to withdraw air from the can 74 to pull the piston 76 downward and through it to force the plunger 72 downward. The pipe 55 is connected to the interior of the can 74 through a tapped opening 96 in a flanged portion of the casing 66. A spring 98 is positioned in the can for maintaining the piston 76 and the plunger 72 normally in their upper positions.

The pressure relief chamber 54 is formed with an opening 102 positioned at one end of the chamber and connected with conduit 51; with an opening 104 positioned at the same end of the chamber and connected with the conduit 50; and with an opening 106 positioned at the opposite end of the cylinder and connected with the conduit 52. Within the chamber 54 is a plunger 108 which separates the opening 106 from the opening 104 but which does not separate the opening 102 from the opening 104. The plunger 108 is provided with an annular cup valve 110 which prevents passage of fluid from the opening 106 toward the opening 104 but allows substantially free passage of fluid from the opening 104 toward the opening 106.

Figure 3:
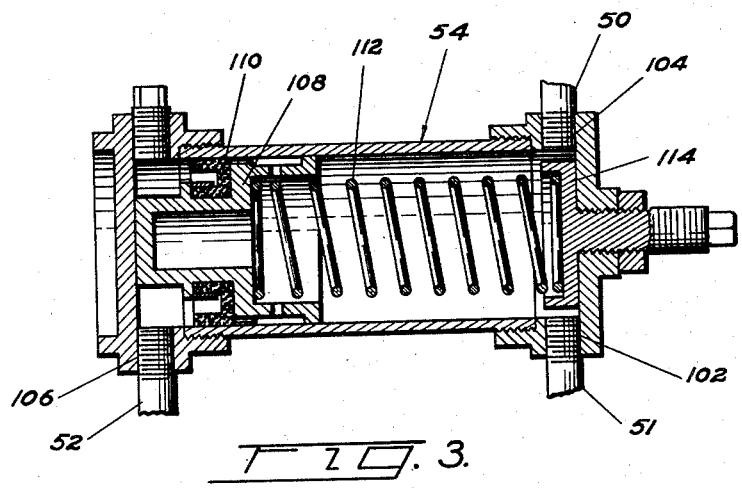
Figure 3 is a view in vertical section and also on a relatively large scale of the pressure relief chamber shown in Figure 1.
Figure 4:
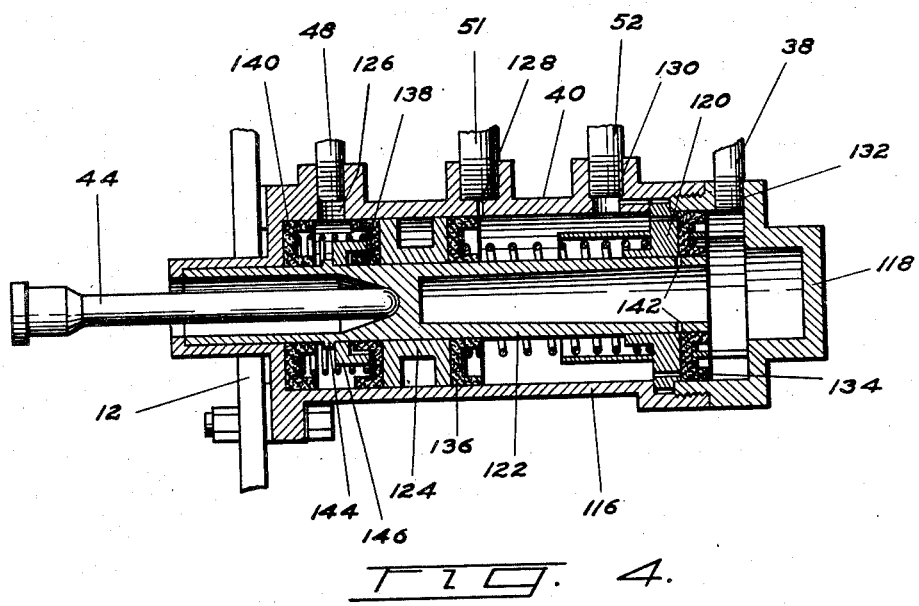
Figure 4 is a view in vertical section and also on a relatively large scale of the master cylinder shown in Figure 1.

The plunger 108 is resiliently urged toward the end of the cylinder adjacent the opening 106 by a spring 112 resting at its opposite end upon an adjustable seat 114. However, when fluid in the conduit 52 is placed under sufficient pressure, the plunger 108 may be moved inward (toward the right as seen in Figure 3) thus compressing the spring 112.

The master cylinder 40 comprises a cylindrical casting 116, a forward cap 118, an annular head 120, a central cylindrical plunger 122 and an annular plunger 124 surrounding the plunger 122. The casting 116 is formed with openings 126, 128, and 130 connected respectively with the conduits 48, 51, and 52 and the cap 118 is formed with an opening 132 connected with the conduit 38. The openings 126, 130, and 132 are relatively large but the opening 128 is relatively small and adapted to be closed by the annular piston 124 as it moves forward.

The head 120 is provided with an annular cup valve 134 allowing substantially free passage of fluid forward past the head but preventing the passage of fluid rearwardly during the operation of the braking system. The annular plunger 124 is provided with a pair of annular cups 136 and 138, one facing in each direction and coacting to prevent the passage of fluid in either direction past the plunger. At the rear end of the cylinder is another annular cup 140 preventing the leakage of fluid from the rear of the cylinder. The plunger 122 adjacent to its forward end is formed with ports 142 through which liquid may flow in either direction past the cup 134 to or from grooves formed in the head 120, but only when the plunger is in its normal rearward position as shown.

It is to be understood that normally the annular plunger 124 is operated by fluid pressure introduced into the cylinder 116 rearward of the plunger 124 through the conduit 48. However, a safety feature is provided to operate in the event of power failure. The plunger 122 just rearward of the plunger 124 is formed with a shoulder 144 designed to contact with a collar 146 thus serving in any emergency which might be caused by the failure of the power operation to transmit force applied to the plunger 122 by the pedal through the shoulder and collar to the annular plunger 124.

In the operation of the device illustrated a slight pressure on the pedal 42, first moves the port 142 to a closed position and shifts the valve 60 so that the manifold 58 draws air from the reservoir 46 thus drawing down the plunger 72 and forcing additional liquid under pressure through the conduit 48 to the rear of the cylinder 40. This liquid under pressure acts on the piston 124 forcing it forward, cutting off the port 128, and forcing the liquid trapped in the cylinder 40 ahead of the piston 124 past the head 120 and through the conduit 38 to the wheel cylinders 36. This forces the shoes outward against the drums.

The spring 112 is so weighted and adjusted that as soon as a predetermined pressure slightly greater than that necessary to apply the brakes lightly is reached, the spring 112 begins to compress and no further liquid is forced forward past the cup 134. However, the liquid already forced forward past the cup cannot return and by reason of the small area of the plunger 122 additional pressure on the foot pedal is effective to apply substantially as great pressures as may be desired. Preferably the brake application by means of the power slack take-up does not cause any retarding force to drum rotation but as a practical matter the weight of the spring may be adjusted so as to exert a slight retarding force only.

When the pedal is released the plunger 122 returns, thus decreasing the pressure in the cylinders 36. As soon as the plunger reaches the position shown the valve 60 is shifted back to its normal position and air is allowed to enter the can 74 beneath the piston 76. The piston 76 and the plunger 72 rise and pressure of liquid ahead of the plunger 124 returns said plunger to the position shown. This allows the spring 112 to return the plunger 108 to the position shown.

Thereupon the liquid throughout the system is again reduced to atmospheric pressure. The liquid in the plunger 72 is in communication with the atmosphere through vents in the cap 70; that in the conduit 50 is in communication with the interior of the plunger 72 through the ports 90 and the opening 92; that in the right hand side of the chamber 54 is in communication with the conduit 50 through the opening 104; that in the cylinder 40 ahead of the plunger 124 but rearward of the head 120 is in communication with the said right hand side of the chamber 54 through the conduit 51 and the port 128; that in the left hand side of the chamber 54 is in communication with the said last named portion of the cylinder 40 through the conduit 52; that in the forward portion of the cylinder 40 is in communication with the portion just rearward of the head 120 through the port 142 and the grooves in the head 120; and that in the rearward portion of the cylinder is in communication with the interior of the plunger 72 through the conduit 48, the cap 68, the grooves 87 and 89, and the ports 90. Thus the entire system is automatically adjusted to compensate for expansion or contraction of the liquid due to temperature changes, for any wastage which might occur in operation, and for the liquid trapped ahead of the plunger 122 during the brake applying stroke.

The provision of the pressure relief chamber insures that the automatic shoe applying stroke shall always apply the shoes with a definite predetermined pressure. Moreover, it insures that the annular plunger 124 always moves forward far enough to allow an unrestricted full stroke of the small plunger 122.

Figure 5:
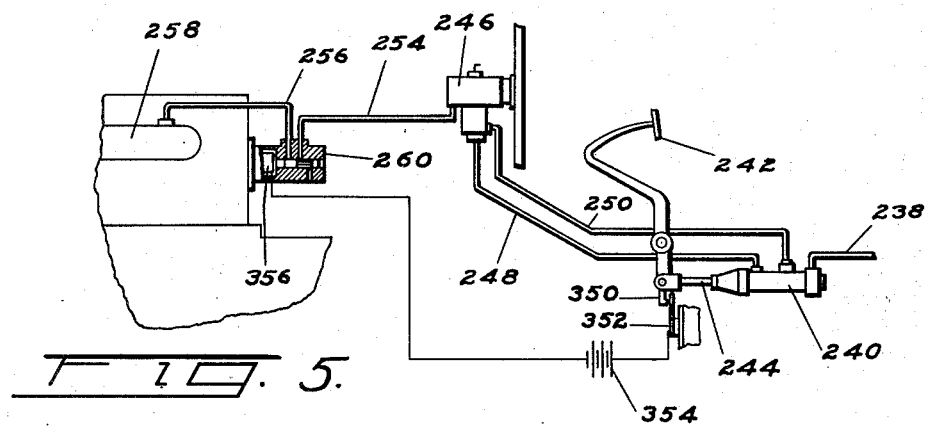
Figure 5 is a diagrammatic view in elevation of a modified form of braking system constructed according to our invention.
Figure 6:
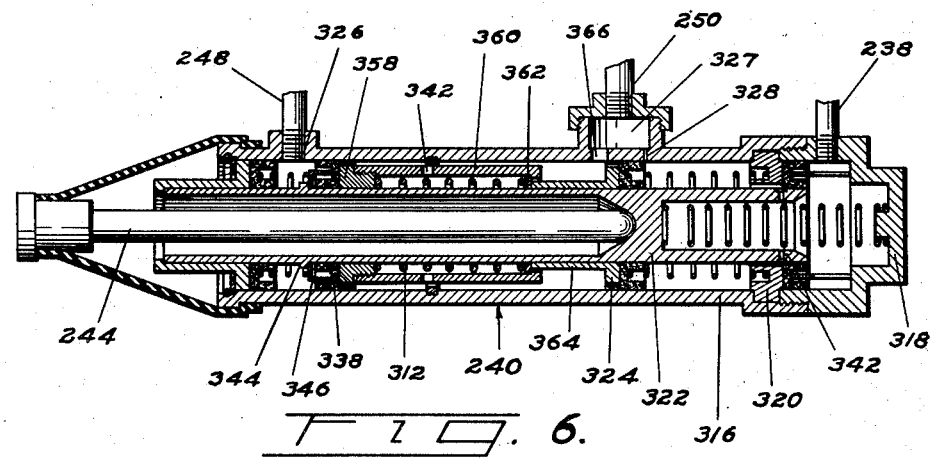
Figure 6 is a view in vertical section and on an enlarged scale showing the master cylinder illustrated diagrammatically in Figure 5.

In Figures 5 and 6 the manifold 258 is at times connected through the conduit 256, the valve 260, and the conduit 254 with the power actuator and reservoir 246, the latter being similar in all respects to the unit 46. The pressure outlet of the unit 246 is connected by a conduit 248 with the inlet 326 of the master cylinder 240 and the reservoir outlet of the unit 246 is connected by a conduit 250 with a small cup 327 on said master cylinder 240. The master cylinder 240 is provided with an outlet conduit 238 leading to wheel cylinders (not shown) and is operated by a pedal 242 through piston rod 244 and through the valve 260.

The pedal 242 is adapted to operate valve 260 electrically. To this end, the pedal 242 is formed with an extension 350 adapted when the pedal is first moved to close a switch 352 interposed in circuit with a battery 354 and a solenoid 356, the latter being connected to operate the valve 260.

The cylinder 240 is formed of a main cylindrical casting 316 and a forward cap 318. It is provided with fixed head 320, a central piston 322 and an annular piston 324. A port 328 is provided connecting the cup 327 with the interior of the cylinder just ahead of the rearward position of the piston 324 and a port 342 is provided in the forward end of the plunger 322.

Means are provided within the cylinder itself which perform the function of the pressure relief chamber 54. A shoulder 344 formed on the plunger 322 cooperates with a collar 346 in a manner similar to that described above in connection with shoulder 144 and collar 146. The collar 346 is maintained in contact with an annular cup 338 by a suitable spring. The cup 338 is associated with an annular head 358 to which there is connected a valve cage 360 housing a relatively heavy spring 312. The rear end of the spring 312 bears on the head 358 and the forward end on a collar 362 which in turn bears on the rear end of an extension 364 formed on the piston 324. The chamber formed between the heads or pistons 324 and 358 is connected to the reservoir through an opening 366 leading into the cup 327.

The operation of the system disclosed in Figures 5 and 6 is substantially the same as that described above in detail in reference to Figures 1 to 4 inclusive. However, the initial movement of the pedal 242 closes the switch 352 which is preferably a snap switch and this completes the electric circuit and operates the solenoid 356 and through it the valve 260. Fluid under pressure forced down by the actuator 246 through the conduit 248 to the cylinder 240 acts on the cup 338 and the force thereof is initially transmitted through the head 358, the spring 312, the collar 362, and the projection 364 to the piston 324. However, as soon as the pressure in the system reaches the predetermined minimum, the spring 312 begins to compress and further movement of the pedal acts through the small diameter piston or plunger 322. Should the vacuum fail due to failure of the motor, the pressure from the pedal 242 is transmitted through the rod 244 to the plunger 322 and through the shoulder 344 thereon to the collar 346, the cup 338, the head 358 to the spring 312 and thence to the piston 324.

Figure 2:
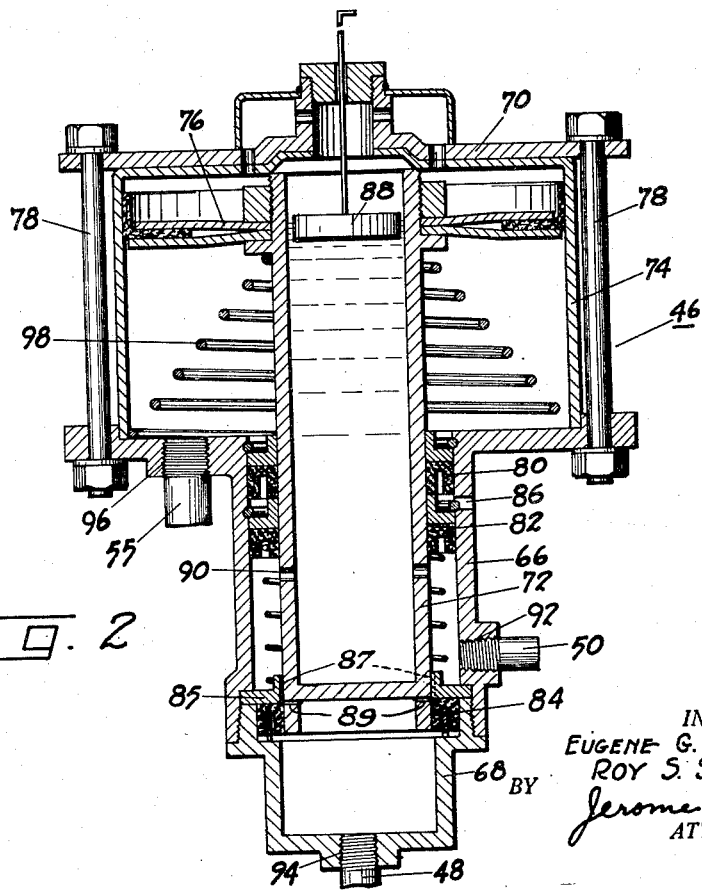
Figure 2 is a view in vertical section and on a relatively large scale of the combined power cylinder and reservoir shown in Figure 1.
Figure 7:
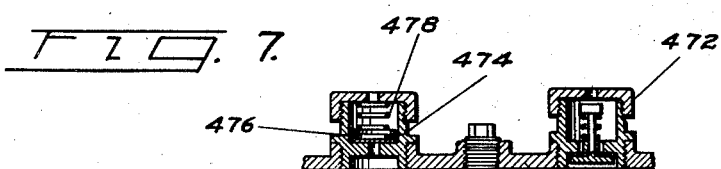
Figure 7 is a view in vertical section and on a still further enlarged scale showing a modified form of valve arrangement adapted for use in the combined reservoir and power actuator shown in Figures 1 and 5.
Figure 8:
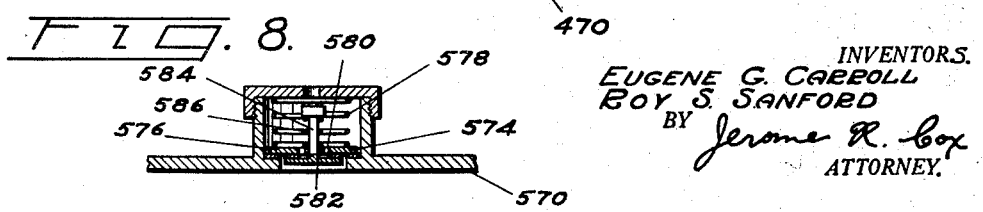
Figure 8 is a similar view showing another modified form of valve arrangement.

In Figures 7 and 8 are shown caps 470 and 570 which may be substituted if desired for the cap 70 shown in Figure 2 or for the cap of the reservoir 246. The cap 470 is provided with a one way check valve 472 which allows substantially free ingress of air but prevents the escape thereof. It is also provided with a spring loaded valve 474 comprising a cup 476 and a spring 478, the spring being of predetermined tension. By means of the arrangement the liquid in the reservoir and therefore throughout the system is maintained under a pressure slightly more than atmospheric. In Figure 11 is shown the cap 570 substituted for the cap 70 as a cover for the reservoir 46.

The cap 570 is provided with a two way valve 574 comprising a flap 576 acted on by a spring 578 and formed with ports 580. The flap 576 also carries a check valve 582, provided with a stem 584, the valve 582 being maintained closed to outward passage by a spring 586 but allowing substantially free inward passage of air.

If the pressure in the system reaches a value greater than desired, the spring 478 or 578 compresses, the cup 476 or the flap 576 lifts from its seat and air is allowed to escape. On account of the free inward passage of air and the pumping action of the plunger 72, the predetermined pressure is soon built up and maintained.

In Figure 9 is shown a combined reservoir and power cylinder 646 provided with a piston 676, and a bellows 672 adapted to be collapsed when air is withdrawn by the intake manifold from beneath the piston 676 out through the opening 696.

Thus liquid may be forced out through the opening 694 into conduit 648 to the master cylinder associated therewith. A check valve 677 may be associated with the piston 676 to allow the system to be replenished with liquid when necessary.

In Figure 10 there is shown a vacuum booster 746 connected through conduit 755 with control valve 760, the valve being connected through conduit 756 with the intake manifold 758. The control valve 760 is operated by the pedal 742 through a tension link 762 in which there is interposed a spring 764. The pedal is connected through a link 743 and a piston rod 744 with a master cylinder 740, the latter having its outlet connected to a conduit 738 leading to a wheel cylinder 736 positioned in a brake drum 718.

The master cylinder 740 is provided with a plunger 822 which at its rearward end is provided with a pair of reversed sealing cups 839 and 841 and at its forward end extends through an annular head 820 and an annular packing cup 834 associated with said head. Just rearwardly of the head 820 the cylinder is formed with a recess 821 which is connected through a conduit 748 with the booster cylinder 746. It is to be noted that the booster cylinder 746 is not formed with an opening corresponding to the opening 92 of the booster cylinder 46, all of the liquid being supplied through the one conduit 748. The cylinder 746 is exactly like the cylinder 46 except for the opening 92 and serves as a reservoir as well as a booster. Grooves corresponding to the grooves 87 and 89 allow compensation.

In the operation of this embodiment of our invention depression of the pedal 742 moves the port 842 ahead of the cup 834 and operates the valve 760. Thereupon suction created by the motor operates the booster cylinder 746 to force fluid through the conduit 748 past the head 820 and the cup 834 and through the conduit 738 to the cylinders 736, thus moving the shoes to the drums. Thereafter further pressure of the pedal 742 moves the plunger 822 further forward increasing the pressure in the wheel cylinders and applying the shoes to the drums with greater force.

It is to be understood that the above described embodiments of our invention are for the purpose of illustration only and various changes may be made therein without departing from the spirit and scope of the invention.

We claim:

1. In a hydraulic force transmission system, a master cylinder, a piston in said cylinder provided with a packing allowing passage of fluid past said piston in one direction but preventing passage of fluid in the opposite direction, a motor, connections between said cylinder and motor, power means for forcing fluid past said packing to take up initial clearances associated with said motor and means connected to said piston for operating said piston to apply greater pressures to the fluid.

2. In a hydraulic brake system, a brake pedal, a master cylinder, a wheel cylinder, lines connecting said master cylinder and said wheel cylinder, a power slack take-up device including a piston in said master cylinder operated by initial movement of the brake pedal and acting on the liquid to produce pressure in the lines sufficient to take up the shoe clearance, a second piston in the master cylinder operated by further movement of the pedal which after the slack take-up will produce braking pressures in the lines without assistance from the power device and means for preventing said braking pressure from reacting on said power slack take-up piston.

3. In a hydraulic force transmission system, a master cylinder, power means including a piston arranged to impose pressure on the liquid and a pneumatically actuated piston arranged to operate the liquid piston for forcing a relatively large quantity of liquid through from the master cylinder to take up initial clearances, another piston for forcing additional liquid from the cylinder to develop higher pressures and means for preventing said higher pressures from reacting on the first mentioned piston and on the pneumatically actuated piston.

4. In a hydraulic brake system, a master cylinder, power means including a power operated piston for forcing a relatively large quantity of fluid from the master cylinder to take up brake clearances, a piston for forcing additional fluid from the cylinder to develop higher braking pressures, and means to insure operation of the power operated piston manually in the event of failure of power to operate said piston.

5. In a hydraulic force transmission system a master cylinder, a vacuum cylinder having connections leading to said master cylinder, a fluid motor connected to said master cylinder, and a pressure relief chamber associated with said master cylinder.

6. For use in a hydraulic force transmission system a master cylinder, a central piston mounted in said master cylinder, an annular piston mounted in said master cylinder and surrounding said central piston, manual means for displacing one of said pistons, and power means for displacing the other of said pistons.

7. For use in a hydraulic force transmission system a master cylinder, a central piston mounted in said master cylinder, an annular piston mounted in said master cylinder and surrounding said central piston, means for displacing one of said pistons, separate means for displacing the other of said pistons, and means associated with one of said pistons for bearing upon and displacing the other said piston in the event of a failure of one of said displacing means.

8. For use in a hydraulic force transmission system a master cylinder, a central piston mounted in said master cylinder, an annular piston mounted in said master cylinder and surrounding said central piston, manual means for displacing one of said pistons, power means for displacing the other of said pistons, and electric means for controlling the operation of said power means.

9. In a hydraulic force transmission system a reservoir formed of a container having two diameters, an annular disk slidably mounted in said container and having a cylindrical extension, means for drawing air from said container beneath said disk, means for venting air from said container above said disk, means for filling the cylindrical extension with liquid, an inwardly opening check valve positioned above said disk, and an outwardly opening spring loaded check valve also positioned above said disk.

10. In a hydraulic force transmission system a reservoir formed of a container having two diameters, an annular disk slidably mounted in said container and having a cylindrical extension, means for drawing air from said container beneath said disk, means for venting air from said container above said disk, means for filling the cylindrical extension with liquid, and a check valve opening freely in one direction but spring loaded in the opposite direction secured to said container above said disk.

11. For use in a vehicle, means for retarding said vehicle, a power means having a variable stroke for operating said retarding means with a pressure so light that it need not be graduated, relatively powerful manually controlled applying means for adding a graduated pressure, and means comprising a check valve for preventing the graduated pressure added by the manually controlled applying means from reacting on the relatively light power means.

12. In a force transmission system using fluid, an operating cylinder, a master cylinder, connections between said cylinders, a reservoir, a connection between said reservoir and said master cylinder, a pair of pistons in said master cylinder having different areas, means including said pistons for dividing said master cylinder into a plurality of compartments including a compartment in which the fluid is acted on by said large area piston and a compartment in which the fluid is acted on by said small area piston, a pressure relief chamber connected to said first mentioned compartment, means for bypassing fluid from said first mentioned compartment to said last mentioned compartment and for trapping the fluid thus bypassed, means for operating said large area piston, and separate means for operating said small area piston.

13. A hydraulic force transmission system comprising a master cylinder, an annular head in said master cylinder, a packing cup associated with said head and serving as a one-way check valve, a piston sliding through said head and cup, a manually controlled pedal connected to said piston, and means for forcing liquid into said cylinder and past said cup including a power motor having a variable stroke for operating said retarding means with a pressure so light that it need not be graduated by the initial movement of said pedal.

14. For use with a hydraulic force transmission system, in combination a container formed with a pair of cylindrical portions one having a larger diameter than the other and each having a vertical axis aligned with the axis of the other, a piston in said container formed of an annular disk having an external diameter corresponding to the diameter of the larger cylindrical portion and provided with a circular opening having an internal diameter corresponding to the diameter of the smaller cylindrical portion, and a cylinder having an external diameter corresponding to the diameter of the smaller cylindrical portion secured to the disk and extending through and closing the opening therein, said cylinder having its lower end closed and its upper end open whereby it serves not only as a piston but also as a reservoir for a reserve supply of actuating fluid.

15. A slack take-up and force-ratio multiplier for hydraulic brakes and the like, comprising in combination, a displacing piston for taking up slack; a displacing piston for exerting braking force; power means for actuating the first piston; manually actuated means for actuating the second piston; controlling means for said power means arranged to be operated upon initial motion of said manually actuated means in a force-developing direction; and connections whereby said manually actuated means will also actuate the first piston should said power means fail to function.

16. A slack take-up and force-ratio multiplier for hydraulic brakes and the like, comprising in combination, a displacing piston for taking up slack; a displacing piston for exerting braking force; power means for actuating the first piston; manually actuated means for actuating the second piston; controlling means for said power means arranged to be operated upon initial motion of said manually actuated means in a force-developing direction; and connections between said pistons whereby motion of the second entails motion of the first, should said power means fail to function.

17. The combination of claim 16, further characterized in that one of said pistons is arranged for limited sliding movement in the other.

18. A slack take-up and force ratio multiplier for hydraulic brakes and the like, comprising in combination, a displacing piston for taking up slack; a displacing piston for exerting braking force, said pistons being in such one-way thrust relation with each other that motion of the second in a displacing direction entails motion of the first in a displacing direction; power actuating means in one-way thrust relation with the first piston and capable of moving it in displacing direction; manual actuating means for the second piston; and a controller for said power means arranged to be shifted upon initial motion of said manual means in a displacing direction.

19. The combination of claim 18, further characterized in that one of said pistons is arranged for limited sliding motion in the other.

20. The combination of claim 18, further characterized in that the operating connection between the first piston and its power actuating means is arranged to lock against retrograde motion of the piston at the limit of its displacing motion and thus protect the power means from braking stress.

21. The combination of claim 16 further characterized in that the second of said pistons is arranged for limited sliding movement in the first.

EUGENE G. CARROLL.
ROY S. SANFORD.